US009154903B2

(12) United States Patent
Adams et al.

(10) Patent No.: US 9,154,903 B2
(45) Date of Patent: Oct. 6, 2015

(54) MOBILE COMMUNICATIONS DEVICE PROVIDING NEAR FIELD COMMUNICATION (NFC) CARD ISSUANCE FEATURES AND RELATED METHODS

(75) Inventors: Neil Patrick Adams, Waterloo (CA); Ravi Singh, Toronto (CA); Vincenzo Kazimierz Marcovecchio, Ottawa (CA)

(73) Assignee: BlackBerry Limited, Waterloo (CA)

( * ) Notice: Subject to any disclaimer, the term of this patent is extended or adjusted under 35 U.S.C. 154(b) by 339 days.

(21) Appl. No.: 13/338,663

(22) Filed: Dec. 28, 2011

(65) Prior Publication Data

US 2013/0171929 A1    Jul. 4, 2013

(51) Int. Cl.
H04B 5/00         (2006.01)
H04W 4/00         (2009.01)
H04M 1/725        (2006.01)

(52) U.S. Cl.
CPC .......... *H04W 4/008* (2013.01); *H04M 1/72525* (2013.01); *H04M 2250/04* (2013.01)

(58) Field of Classification Search
CPC ......... G06F 21/22; G06F 21/17; G06F 21/30; G06F 9/445; G06F 1/26; G06Q 10/10; H04B 5/00
USPC ...................................................... 455/41.1
See application file for complete search history.

(56) References Cited

U.S. PATENT DOCUMENTS

| | | | | |
|---|---|---|---|---|
| 7,865,141 | B2 * | 1/2011 | Liao et al. ..................... | 455/41.2 |
| 8,060,413 | B2 * | 11/2011 | Castell et al. ................. | 705/26.1 |
| 8,566,239 | B2 * | 10/2013 | Arthur et al. .................... | 705/41 |
| 2010/0044433 | A1 | 2/2010 | Wankmueller et al. ....... | 235/381 |
| 2010/0058463 | A1 * | 3/2010 | Bertin ............................. | 726/17 |
| 2010/0125508 | A1 | 5/2010 | Smith ............................. | 705/16 |
| 2012/0171992 | A1 * | 7/2012 | Cheong et al. ................ | 455/410 |

(Continued)

FOREIGN PATENT DOCUMENTS

| | | |
|---|---|---|
| EP | 1347623 | 9/2003 |
| EP | 1976248 | 10/2008 |
| EP | 2106107 | 9/2009 |
| KR | 1020110049649 | 5/2011 |
| WO | 2004040923 | 5/2004 |
| WO | 2008103879 | 8/2008 |

(Continued)

OTHER PUBLICATIONS

"Dynamic Card Solutions Enhances CardWizard Perso-to-Go Instant Issue Mobile Payments Platform with Support for NFC MicroSd Cards" http://www.nstantissueance.com/dynamic-card-solutions-enhances-cardwizard-person-to-go . . . Printed Aug. 22, 2011.

*Primary Examiner* — Edward Urban
*Assistant Examiner* — Ralph H Justus
(74) *Attorney, Agent, or Firm* — Ridout & Maybee LLP

(57) ABSTRACT

A communications system may include a provisioning terminal comprising a first near field communications (NFC) device, where the provisioning terminal is capable of communicating with a provisioning server. The system may further include a mobile communications device comprising a second NFC device, a processor capable of providing a mobile wallet interface, a memory, and a memory controller coupled with the second NFC device, the memory, and the processor. The memory controller may be capable of receiving an applet and associated mobile wallet interface data from the provisioning server via the provisioning terminal based upon NFC communication between the first NFC device and the second NFC device, storing the applet and the associated mobile wallet interface data in the memory, and sending the mobile wallet interface data from the memory to the processor for the mobile wallet interface.

22 Claims, 7 Drawing Sheets

(56) References Cited

U.S. PATENT DOCUMENTS

2012/0172026 A1* 7/2012 Kwon et al. .................. 455/419
2012/0174189 A1* 7/2012 Lim et al. .......................... 726/3

FOREIGN PATENT DOCUMENTS

| WO | 2009141805 | 11/2009 |
| WO | 2012091349 | 7/2012 |

* cited by examiner

MOBILE COMMUNICATIONS DEVICE PROVIDING NEAR FIELD COMMUNICATION (NFC) CARD ISSUANCE FEATURES AND RELATED METHODS

TECHNICAL FIELD

This application relates to the field of communications, and more particularly, to mobile wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile communications devices. This short-range high frequency wireless communications technology exchanges data between devices over a short distance, such as only a few centimeters.

DETAILED DESCRIPTION

Figure 1:
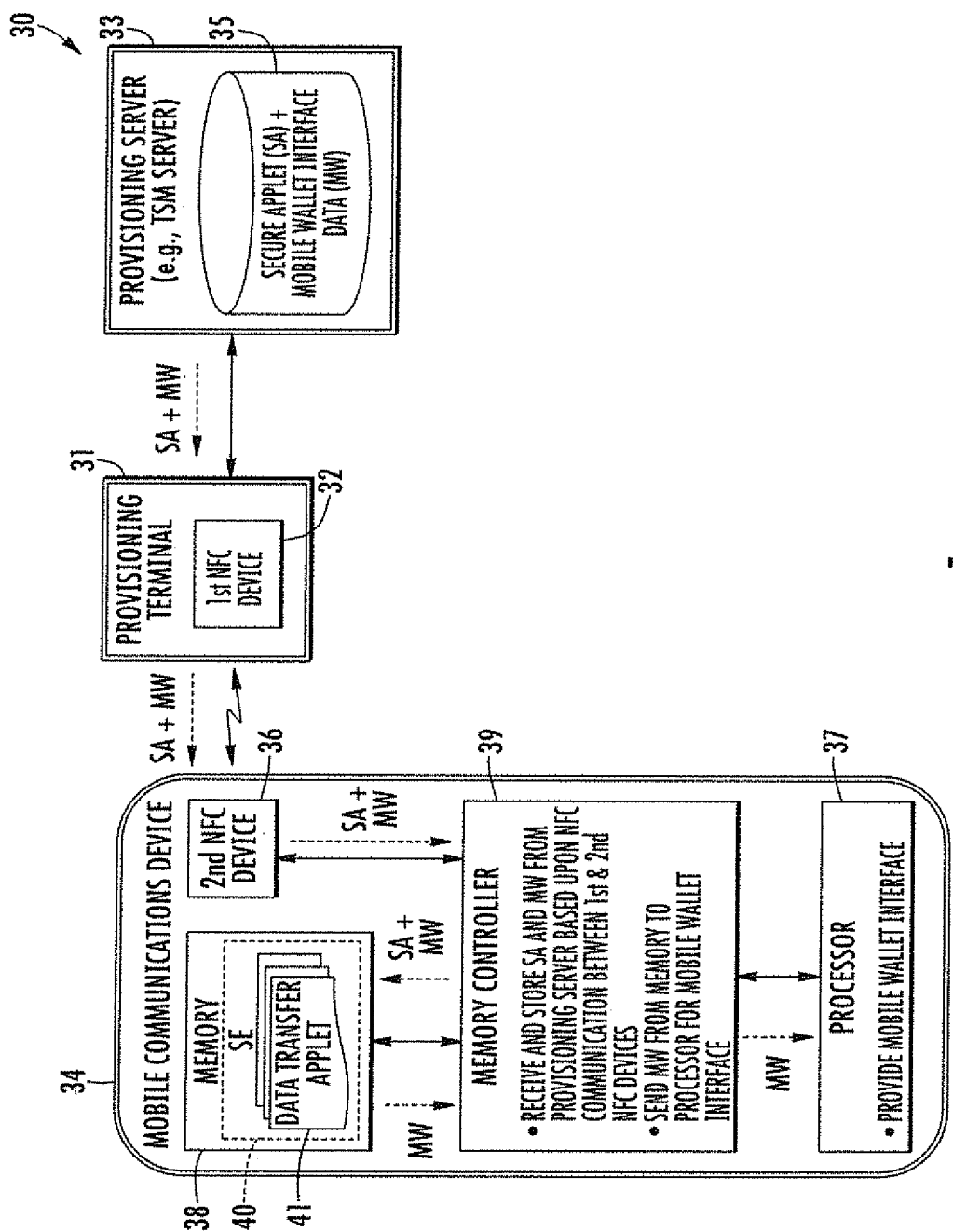
FIG. 1 is a schematic block diagram of a communications system in accordance with an example aspect.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a communications system is provided herein which may include a provisioning terminal comprising a first near field communications (NFC) device, where the provisioning terminal is capable of communicating with a provisioning server. The system may further include a mobile communications device comprising a second NFC device, a processor capable of providing a mobile wallet interface, a memory, and a memory controller coupled with the second NFC device, the memory, and the processor. The memory controller may be capable of receiving an applet and associated mobile wallet interface data from the provisioning server via the provisioning terminal based upon NFC communication between the first NFC device and the second NFC device, storing the applet and the associated mobile wallet interface data in the memory, and sending the mobile wallet interface data from the memory to the processor for the mobile wallet interface. Accordingly, the system may advantageously allow for instant issuance of a NFC payment card, security card, etc., to the mobile communications device, and without the need for over-the-air (OTA) provisioning, for example.

More particularly, the memory may have a data transfer applet stored therein, and the memory controller may be capable of invoking the data transfer applet to receive the applet and associated mobile wallet interface data. Furthermore, the memory controller may be capable of providing a notification to the processor based upon NFC communication between the first NFC device and the second NFC device, and the processor may be capable of querying the memory controller to determine whether the data transfer application was invoked based upon the notification. In addition, the processor may be further capable of causing the secure element controller to send the mobile wallet interface data based upon the secure element controller invoking the data transfer applet.

In accordance with one example embodiment, the memory controller may be capable of receiving the applet and the associated mobile wallet interface data during a same transaction. By way of example, the provisioning server may comprise a trusted service manager (TSM) server, and the memory controller may be capable of storing the applet and the associated mobile wallet interface data in the memory only when the memory controller receives the applet and the associated mobile wallet interface data from the TSM server, for example. Additionally, the mobile wallet interface data may include graphic data, for example.

A related mobile communications device, such as the one described briefly above, and a related communications method are also provided. The communications method may include establishing a near field communications (NFC) link between a mobile communications device and a provisioning terminal, where the provisioning terminal may be capable of communicating with a provisioning server. The method may further include receiving an applet and associated mobile wallet interface data from the provisioning server via the provisioning terminal based upon the NFC communication between the provisioning terminal and the mobile communications device, storing the applet and the associated mobile wallet interface data in the memory, and sending the mobile wallet interface data from the memory to the processor for the mobile wallet interface.

A related non-transitory computer-readable medium for a mobile communications device, such as the one described briefly above, is also provided. The computer-readable medium may have computer executable instructions for causing the mobile communications device to perform steps including establishing a NFC link between a mobile communications device and a provisioning terminal, the provisioning terminal being capable of receiving data from a provisioning server, receiving an applet and associated mobile wallet interface data from the provisioning server via the provisioning terminal based upon the NFC communication between the provisioning terminal and the mobile communications device, and sending the mobile wallet interface data from the memory to the processor for the mobile wallet interface.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of several centimeters (typically up to about 4 cm, or up to about 10 cm, depending upon the given implementation), but other suitable versions of near field communication which may have different operating frequencies, effective ranges, etc., for example, may also be used.

With respect to NFC-enabled security tokens, such as plastic credit cards, security (e.g., physical access) cards, etc., some trusted service managers (TSMs) offer a service known as "instant issuance". Typically, only a TSM may write or modify data (e.g., payment account applets, secure account data, etc.) to the memory on an NFC-enabled device. With instant issuance, a customer or user is able to walk into a bank branch, for example, apply for a payment card (e.g., a credit or debit card), and have the card prepared for him, fully personalized and with a provisioned NFC device, a short time later (i.e., within the same visit). Such provisioning is enabled through a secure channel from the bank's instant issuance computer or terminal to the bank's TSM, and a printing device which prints and embosses the plastic card. By way of example, the secure channel may be implemented in accordance with the GlobalPlatform Card Specification v2.2, or other suitable secure channel architecture.

While the above-described instant issuance approach generally works for plastic payment (or security) cards, problems may arise when attempting to provision mobile communications devices (also referred to herein as "mobile devices") for electronic or "soft" payment cards through such an instant issuance process. For example, plastic payment card personalization simply involves printing and embossing the plastic card. However, personalization for a mobile device involves downloading or receiving appropriate applet data for the secure element, as well as graphics or other data for the soft card for a mobile or electronic wallet (e-wallet) running on the mobile device.

Such mobile device personalization is currently performed through over-the-air (OTA) communications. However, this may be problematic because it assumes the mobile device has cellular or other wireless network data access (e.g., wireless LAN (WLAN) or WiFi, etc.), which may not be the case. For example, the mobile device might be in a location where wireless network coverage is poor or unavailable. In another example, a user may be traveling in a foreign country, and the mobile device may not be configured for use with the local communications systems (e.g., a local SIM card has not yet been obtained for the mobile device).

Figure 2:
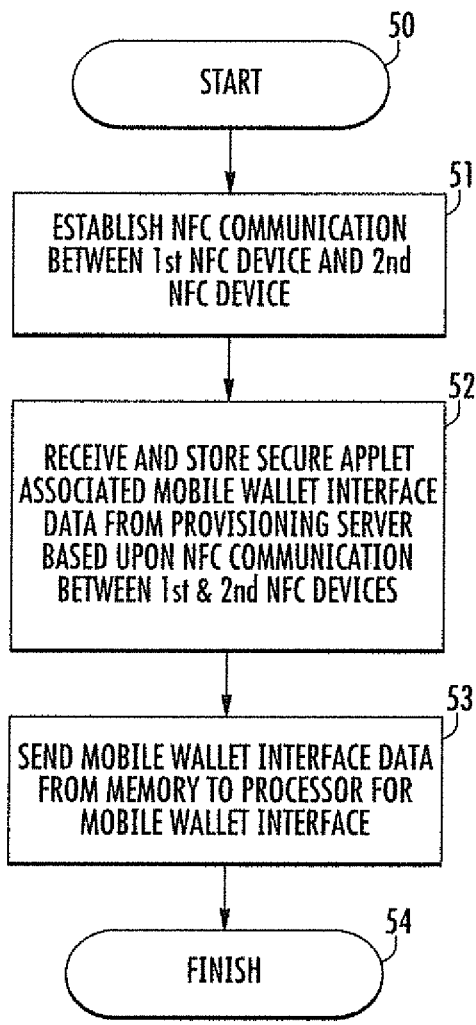
FIGS. 2 and 3 are flow diagrams illustrating example method aspects associated with the system of FIG. 1.
Figure 3:
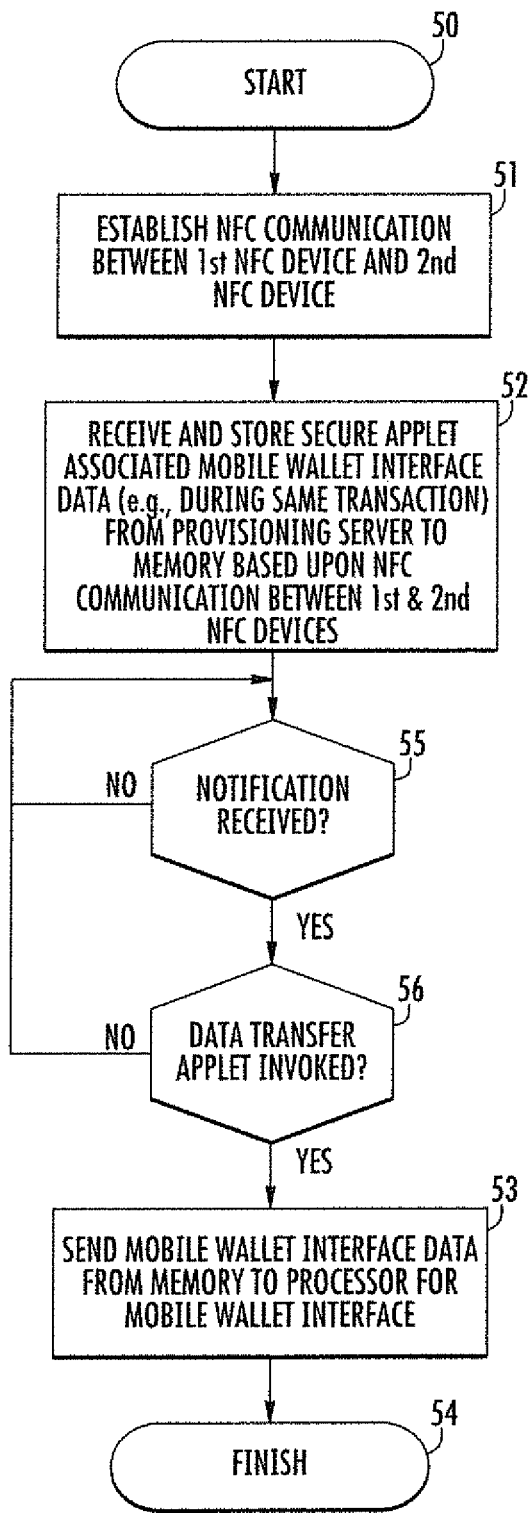

Referring initially to FIGS. 1 through 3, a communications system 30 and related method aspects are first described which may advantageously help address the above-noted problems associated with provisioning of mobile devices. The system 30 illustratively includes a provisioning terminal 31 comprising a first NEC device 32, and the provisioning terminal 31 may be configured to communicate with a provisioning server 33. The system 30 further illustratively includes a mobile device 34. By way of example, the provisioning terminal 31 may comprise a computer at a branch of a financial institution, and the first NEC device 32 may comprise an NFC reader coupled with the computer. It should be noted that while the examples herein are provided with reference to issuance of NEC-based payment credentials, such as a soft NEC payment card from a financial institution (e.g., a bank), the approach described herein may also be used with security institutions (e.g., issuers of NEC soft cards for gate or building access), or other institutions that issue personalized NEC-based transaction authorization credentials or soft cards. In some configurations, the computer and NEC reader may be included within a same physical housing, although they may also be separate physical devices coupled together via a wired (e.g., USB, etc.) or wireless connection (e.g., Bluetooth, WLAN, etc.) in other embodiments.

The provisioning server 33 may comprise a TSM server, which may be a dedicated TSM for the financial institution, or a TSM that handles provisioning for a particular type of mobile device 34 (e.g., the TSM may be provided by the manufacturer of the mobile device or a network carrier, such as a cellular network carrier). The TSM further illustratively includes a database or memory 35 configured to store the appropriate applet (e.g., a secure applet (SA)) and mobile wallet information (e.g., graphics data, etc.) for provisioning the mobile device 34 with the soft payment card or other payment credentials. As noted above, the provisioning terminal 31 and the provisioning server 33 may communicate via a secure channel, such as a GlobalPlatform channel or other suitable secure channel architecture.

The mobile device 34 illustratively includes a second NFC device 36, a processor 37 configured to provide a mobile wallet interface, a memory 38, and a memory controller 39 coupled with the second NFC device 36, the memory 38, and the processor 37. By way of example, the memory 38 may define a secure element 40, and the memory controller 39 may comprise a secure element controller. Moreover, the memory 38 may comprise a subscriber identity module (SIM) card, an electronic universal integrated circuit card (eUICC), a removable memory, an SD card, an embedded memory, etc., for example. Also, the memory (e.g., secure element) controller 39 may be included within an NFC chip set (along with the memory 38 in some example embodiments).

Example mobile devices 34 may include portable or personal media players (e.g., music or MP3 players, video players, etc.), portable gaming devices, portable or mobile telephones, smartphones, portable computers (e.g., tablet computers), digital cameras, etc. The processor 37 may be implemented using suitable hardware (e.g., microprocessor, memory, etc.) and a non-transitory computer-readable medium with computer-executable instructions configured to perform the various operations described herein, for example.

Beginning at Block 50, when the mobile device 34 and the provisioning terminal 31 come within NFC communication range and establish NFC communication, at Block 51, the memory controller 39 and the provisioning sever 33 cooperate to receive or download the secure applet and associated mobile wallet interface data (e.g., card graphics data, driver, etc) from the database 35 and store or write this data to the memory 38 based upon the NFC communication between the first NFC device 32 and the second NEC device 36. That is, the mobile wallet interface data and the secure applet may be downloaded via NEC communication from the provisioning terminal 31 to the secure element 40. However, in some example embodiments a handover or handoff to a different communications medium besides NFC (e.g., Bluetooth, etc.) may occur for downloading at least some of this data. Furthermore, the memory controller 39 may also be configured to read or send the mobile wallet interface data from the memory 38 to the processor 37 for the mobile wallet interface, at Block 53, which concludes the example method illustrated in FIG. 2 (Block 54). The memory controller 39 may also be configured to not read the secure applet data from the memory 38 to the processor 37, to thereby help keep this data secure.

Accordingly, the system 30 may advantageously allow for instant issuance of a NEC payment card, security card, etc., to the mobile device 34, and without the need for over-the-air (OTA) provisioning, for example. That is, the mobile wallet interface data, which would typically have to be downloaded to the mobile device 34 through a separate OTA transaction (e.g., first downloading a mobile wallet application, which subsequently causes the memory controller 39 to download the secure applet from a TSM). This may advantageously allow for provisioning where an OTA connection is not otherwise available, and may also advantageously avoid the need for downloading a separate secure applet installation application. Moreover, the secure applet provisioning may be performed based upon straightforward initiation of NFC communication between the mobile device 34 and the provisioning terminal 31.

In accordance with an example embodiment, the secure element 40 may have a data transfer applet 41 stored therein. The data transfer applet 41 may be a dedicated applet installed by a mobile device manufacturer, for example, that is invoked by the memory controller 39 to perform the instant issuance operations described herein (e.g., download of the mobile wallet interface data from the provisioning server 33, and reading of the mobile wallet interface data to the processor 37). That is, the memory controller 39 may be configured to invoke the data transfer applet 41 to download the associated mobile wallet interface data from the provisioning server 33 in a single or same transaction (i.e., during a same session with the provisioning server).

As noted above, typically only a TSM may be permitted to write or modify data on a secure element. Including the data transfer applet 41 in the secure applet advantageously allows the download process to be initiated from the memory controller 39 without the need for a separate application to be installed on the mobile device 38 ahead of time via an OTA connection. Moreover, this allows the memory controller 39 to retain a secure architecture, such that write or data modification access to the secure element 40 is not permitted by the memory controller 39 except via the provisioning server 33. That is, use of the data transfer applet 41 advantageously allows the memory controller 39 to be configured to permit only the provisioning server 33 to download data to the secure element 40, while still allowing the mobile device 34 to be provisioned with the appropriate mobile wallet interface data and secure applet data without the need for an OTA connection or prior download of an installation application for each respective soft card to be added to the mobile device.

The memory controller 39 may be configured to provide a notification to the processor 37 based upon NFC communication between the first NFC device 32 and the second NFC device 36, at Block 55 (FIG. 3). More specifically, the memory controller 39 may be configured to provide the processor 37 with a notification when the second NFC device 36 enters an NFC field or initiates NFC communication, or similarly when the second NFC device 36 leaves an NFC field or ceases NFC communication. By way of example, the processor 37 and the memory controller 39 may communicate via a dedicated communications channel, such as a JSR-177 channel, for example, although other suitable channel architectures may be used in different embodiments.

Upon receiving a notification of NFC communication from the memory controller 39, the processor 37 may be configured to query the memory controller 39 to determine whether the data transfer application 41 was invoked, at Block 56. If so, the processor 37 may then cause or prompt the memory controller 39 to read the mobile wallet interface data from the secure element 40, so that this data may be used by the processor 37 to provide the mobile wallet interface for card selection.

Figure 4:
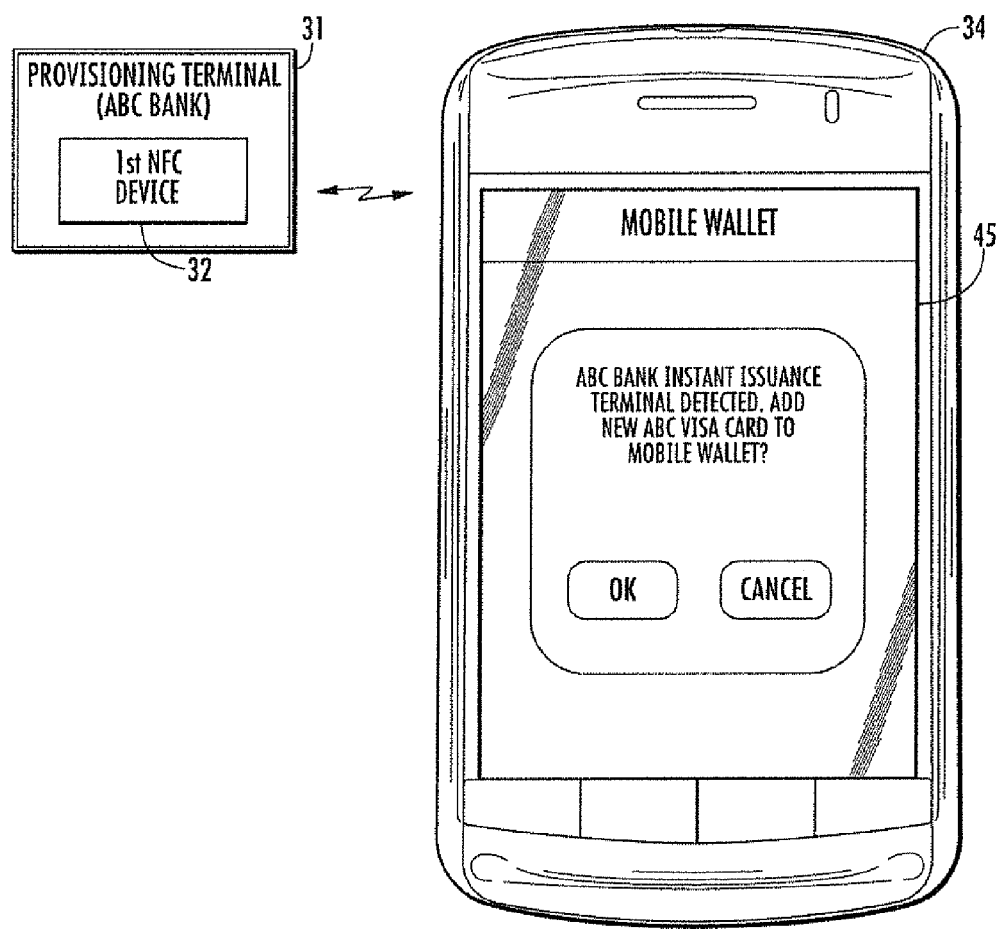
FIGS. 4-6 are a series of front views of an example mobile communications device illustrating provisioning features of the system of FIG. 1 and the methods of FIGS. 2-3.
Figure 5:
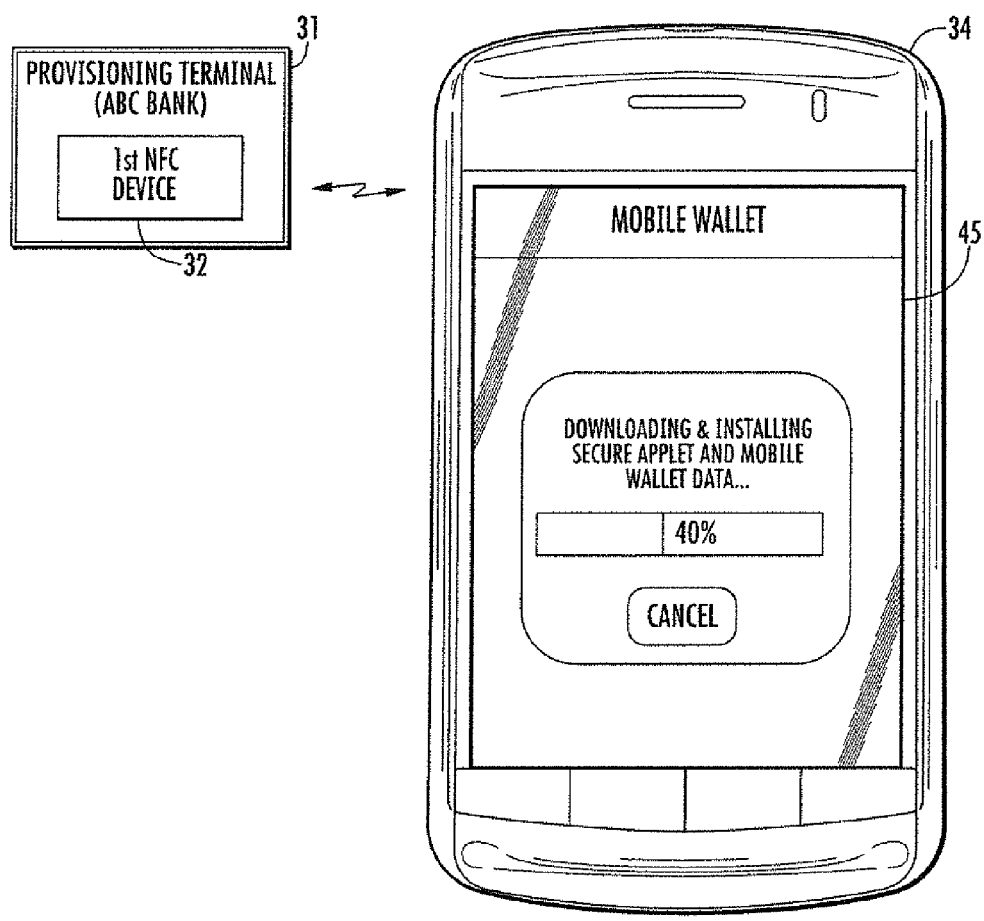
Figure 6:
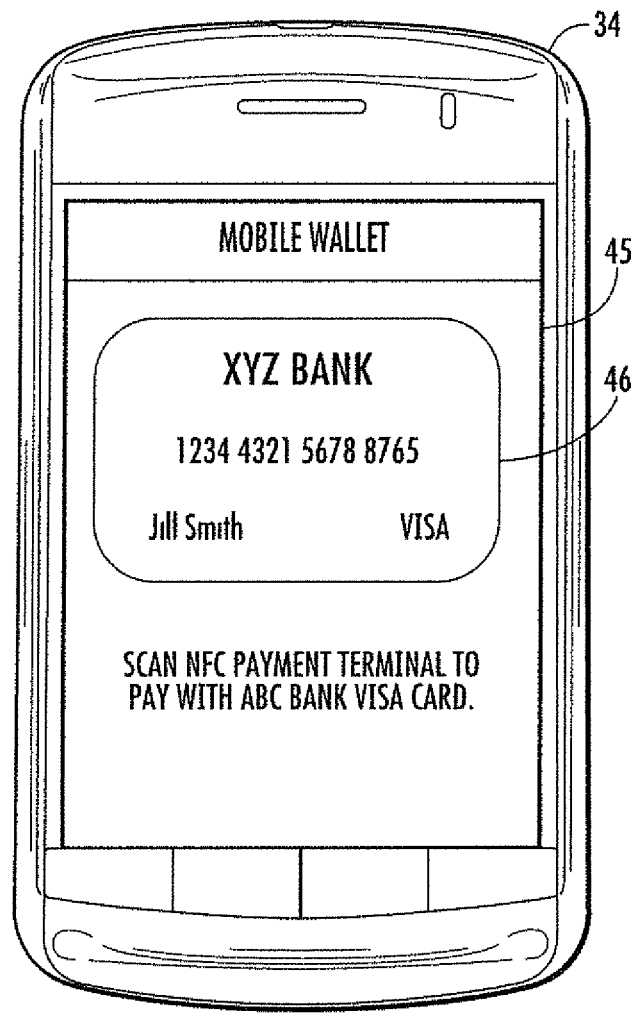

The foregoing will be further understood with reference to an example embodiment, which is now described with reference to FIGS. 4 through 6. In the example embodiment, an instant issuance approach is used to provision the secure element 40 to provide the appropriate secure applet for a soft card, and the associated mobile wallet interface data (e.g., card graphics data, driver, etc.) to the mobile device 34. The data transfer applet 41, which may have a pre-configured or predetermined applet identification (AID), is provisioned onto the secure element 40, such as at the time of manufacturing. The data transfer applet 41 may advantageously be implemented to cause data to be written to the secure element 40 over a GlobalPlatform secure channel, and to cause data to be read from the secure element 40 over an interface with the processor 37 (e.g., a JSR-177 interface), as noted above, although other suitable formats or architectures may also be used. The data transfer applet 41 may optionally also be configured to cause the mobile wallet interface data to be deleted from the secure element 40, such as after reading of this data to the processor 37 is complete.

In an example instant issuance implementation, a client or user places the mobile device 34 adjacent the first NFC device 32 of the provisioning terminal 33. As shown on a display 45 (e.g., a touch screen display) of the mobile device 34, a notification screen may be provided to advise of the instant issuance process, and "OK" and "cancel" selection options are provided to confirm whether provisioning of the given soft card is desired. In the example, the soft card is a payment card (e.g., a VISA credit card) from ABC Bank. Upon confirmation that the mobile device 34 is to be provisioned with the soft payment card, the provisioning terminal 31 proxies a secure channel from the secure element 40 to the provisioning server 33. The provisioning server 33 downloads, installs and personalizes (i.e., provisions) the necessary secure applet data on the secure element 40, as shown in FIG. 5. Moreover, the provisioning server 33 further selects the data transfer applet 41 and writes, over the secure channel, the mobile wallet interface data for a mobile wallet "plug-in" and associated graphics that will correspond to the soft card in the mobile wallet.

Upon removing the mobile device 34 from the field of the provisioning terminal 31, which discontinues NFC communication between the first NFC device 32 and the second NFC device 36, a transaction listener (which may be implemented by the processor 37 as part of the mobile wallet) recognizes that the data transfer applet 41 was selected during the last transaction. As noted above, this may be done responsive to the notification from the memory controller 39 to the processor 37 of the second NFC device 36 ceasing NFC communication with the first NFC device 32. However, in other embodiments, the processor 37 may detect use of the second NFC device 36 in other ways, such as the way in which power is supplied to the second NFC device 36 (e.g., switching between active or passive NFC modes, or to a low power scan rate after NFC communication is complete, etc.).

After determining that the data transfer applet 41 has been invoked, the processor 37 (through the mobile wallet interface) opens a JSR-177 channel to the secure element 40 and reads the mobile wallet interface data that was written to the secure element 40 by the data transfer applet 41. The mobile wallet interface parses the mobile wallet interface data, as appropriate, and installs it as a plug-in for the mobile wallet (although it may be installed as a separate or stand-alone application in some embodiments). The mobile wallet interface may optionally send an appropriate command(s) to the memory controller 39 to invoke the data transfer applet 41 to clear the mobile wallet interface data that was downloaded from the provisioning server 33 from the secure element 40. The mobile wallet interface may then close the JSR-177 channel with the memory controller 39.

At this point, the secure element 40 has advantageously been provisioned with the necessary applet or applets, and the mobile wallet on the mobile device 34 has the necessary plug-ins to interact with those applets. The instant issuance and personalization process is complete, without the mobile device 34 needing to use an OTA (e.g., cellular) data connection. As shown in FIG. 6, a graphic 46 of a credit card is shown on the display 45 in the mobile wallet, along with an indication that the mobile device 34 may now used to perform NFC payment transactions with the new soft credit card. In the illustrated example, the card graphic 46 includes the appropriate credit card information, such as the issuing bank name ("ABC Bank"), a credit card account number ("1234 4321 5678 8765"), a user name ("Jill Smith"), and a credit card type ("VISA"). Here again, it should be noted that other payment card types, as well as other types of soft cards (e.g., security or access cards, etc.), may also be provisioned on mobile device 34 using the above-described approach.

Example components of a mobile communications device 1000 that may be used in accordance with the above-described embodiments are further described below with reference to FIG. 7. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 7:
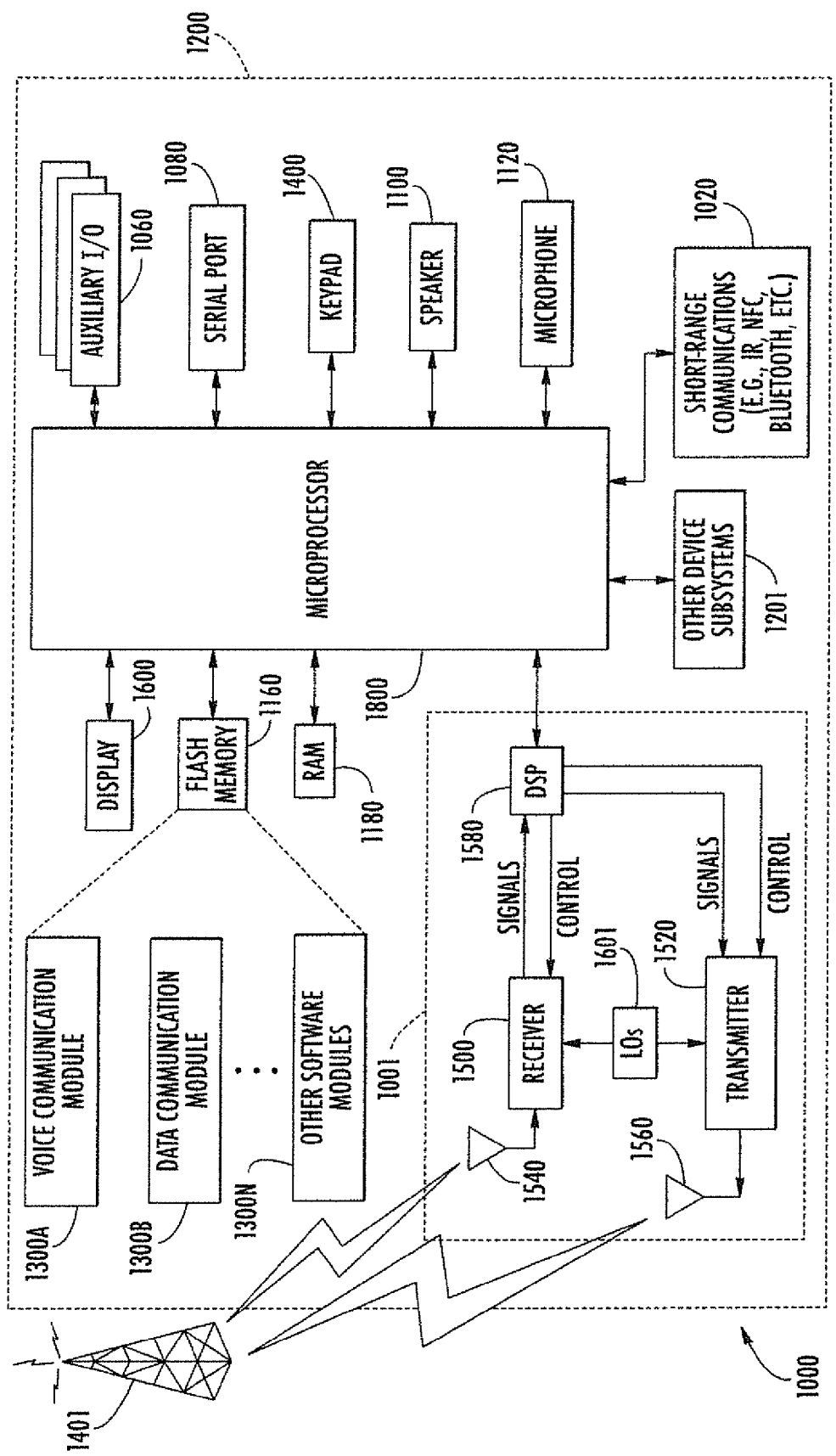
FIG. 7 is a schematic block diagram illustrating example mobile communications device components that may be used with the mobile communications devices shown in FIGS. 1 and 4-6.

In addition to the processing device 1800, other parts of the mobile device 1000 are shown schematically in FIG. 7. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) device (which may include a NEC transceiver and NFC controller, for example) for communicating with a NEC device or NFC tag via NEC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile communications device for use with a provisioning terminal comprising a first near field communications (NFC) device, the provisioning terminal being capable of receiving data from a provisioning server via a secure GlobalPlatform channel, the mobile communications device comprising:
    a second NFC device;
    a processor capable of providing a mobile wallet interface;
    a secure element; and
    a memory controller coupled with the second NFC device, the secure element, and the processor, the memory controller being capable of
        receiving an applet and associated mobile wallet interface data from the provisioning server via the provisioning terminal and without an over-the-air (OTA) connection with the provisioning server based upon NFC communication between the first NFC device and the second NFC device,
        storing the applet and the associated mobile wallet interface data in the secure element, and
        sending the mobile wallet interface data from the secure element to the processor for the mobile wallet interface via a JSR-177 communications channel.

2. The mobile communications device of claim 1 wherein the secure element has a data transfer applet stored therein; and wherein the memory controller is capable of invoking the data transfer applet to receive the applet and associated mobile wallet interface data.

3. The mobile communications device of claim 2 wherein the memory controller is capable of providing a notification to the processor based upon NFC communication between the first NFC device and the second NFC device; and wherein the processor is capable of querying the memory controller to determine whether the data transfer application was invoked based.

4. The mobile communications device of claim 3 wherein the processor is further capable of causing the memory controller to send the mobile wallet interface data based upon the memory controller invoking the data transfer applet.

5. The mobile communications device of claim 1 wherein the memory controller is capable of receiving the applet and the associated mobile wallet interface data during a same transaction.

6. The mobile communications device of claim 1 wherein the provisioning server comprises a trusted service manager (TSM) server; and wherein the memory controller is capable of storing the applet and the associated mobile wallet interface data in the secure element only when the memory controller receives the applet and the associated mobile wallet interface data from the TSM server.

7. The mobile communications device of claim 1 wherein the mobile wallet interface data comprises graphic data.

8. A mobile communications device comprising:
    a near field communications (NFC) device;
    a processor capable of providing a mobile wallet interface;
    a secure element, and
    a memory controller coupled with the NFC device, the secure element, and the processor, the memory controller being capable of
        receiving an applet and associated mobile wallet interface data via the NFC device from a provisioning server via a secure GlobalPlatform channel and without an over-the-air (OTA) connection with the provisioning server,
        storing the applet and the associated mobile wallet interface data in the secure element, and
        sending the mobile wallet interface data from the secure element to the processor for the mobile wallet interface via a JSR-177 communications channel.

9. The mobile communications device of claim 8 wherein the secure element has a data transfer applet stored therein; and wherein the memory controller is capable of invoking the data transfer applet to receive the applet and the associated mobile wallet interface data.

10. The mobile communications device of claim 9 wherein the memory controller is capable of providing a notification to the processor; and wherein the processor is capable of querying the memory controller to determine whether the data transfer application was invoked.

11. The mobile communications device of claim 10 wherein the processor is further capable of causing the memory controller to send the mobile wallet interface data based upon the memory controller invoking the data transfer applet.

12. The mobile communications device of claim 8 wherein the memory controller is capable of receiving the applet and the associated mobile wallet interface data during a same transaction.

13. A communications method comprising:
    establishing a near field communications (NFC) link between a mobile communications device and a provisioning terminal, the provisioning terminal being capable of receiving data from a provisioning server via a secure GlobalPlatform channel, and wherein the mobile communications device comprises a processor capable of providing a mobile wallet interface, a secure element, and a memory controller coupled with the secure element and the processor;

receiving an applet and associated mobile wallet interface data from the provisioning server via the provisioning terminal using the memory controller and without an over-the-air (OTA) connection with the provisioning server based upon the NFC communication between the provisioning terminal and the mobile communications device;

storing the applet and the associated mobile wallet interface data in the secure element; and sending the mobile wallet interface data from the secure element to the processor for the mobile wallet interface using the memory controller via a JSR-177 communications channel.

14. The method of claim 13 wherein the secure element has a data transfer applet stored therein; and wherein receiving comprises invoking the data transfer applet to receive the applet and associated mobile wallet interface data.

15. The method of claim 14 further comprising:
sending a notification to the processor based upon NFC communication; and
determining whether the data transfer application was invoked based upon the notification.

16. The method of claim 15 wherein sending further comprises sending the mobile wallet interface data based upon invoking of the data transfer applet.

17. The method of claim 13 wherein receiving further comprises receiving the applet and the associated mobile wallet interface data during a same transaction.

18. A non-transitory computer-readable medium for a mobile communications device comprising a processor capable of providing a mobile wallet interface, a secure element, and a memory controller, the computer-readable medium having computer executable instructions for causing the mobile communications device to perform steps comprising:
establishing a near field communications (NFC) link between the mobile communications device and a provisioning terminal, the provisioning terminal being capable of receiving data from a provisioning server via a secure GlobalPlatform channel;
receiving an applet and associated mobile wallet interface data from the provisioning server via the provisioning terminal using the memory controller and without an over-the-air (OTA) connection with the provisioning server based upon the NFC communication between the provisioning terminal and the mobile communications device;
storing the applet and the associated mobile wallet interface data in the secure element; and
sending the mobile wallet interface data from the secure element to the processor for the mobile wallet interface using the memory controller via a JSR-177 communications channel.

19. The non-transitory computer-readable medium of claim 18 wherein the secure element has a data transfer applet stored therein; and wherein receiving comprises invoking the data transfer applet to receive the applet and associated mobile wallet interface data.

20. The non-transitory computer-readable medium of claim 19 further having computer-executable instructions for causing the mobile communications device to perform steps comprising:
sending a notification to the processor based upon NFC communication; and
determining whether the data transfer application was invoked based upon the notification.

21. The non-transitory computer-readable medium of claim 20 wherein sending further comprises sending the mobile wallet interface data based upon invoking of the data transfer applet.

22. The non-transitory computer-readable medium of claim 21 wherein receiving further comprises receiving the applet and the associated mobile wallet interface data during a same transaction.

* * * * *